United States Patent
Terami et al.

(10) Patent No.: US 6,698,898 B2
(45) Date of Patent: Mar. 2, 2004

(54) DISPLAY DEVICE AND LIQUID CRYSTAL PROJECTOR

(75) Inventors: Kouji Terami, Higashiosaka (JP); Toshiyuki Okino, Osaka (JP); Hisashi Nakamura, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 38 days.

(21) Appl. No.: 10/293,681

(22) Filed: Nov. 14, 2002

(65) Prior Publication Data

US 2003/0095237 A1 May 22, 2003

(30) Foreign Application Priority Data

Nov. 16, 2001 (JP) .......................................... 2001-351854

(51) Int. Cl.⁷ .............................................. G03B 21/16
(52) U.S. Cl. ............................. 353/52; 353/60; 353/122
(58) Field of Search .............................. 353/52, 57, 60, 353/61, 122

(56) References Cited

U.S. PATENT DOCUMENTS 6,254,238 B1 * 7/2001 Takamatsu .................... 353/61
6,450,646 B1 * 9/2002 Ono et al. ..................... 353/57

* cited by examiner

*Primary Examiner*—William Dowling
(74) *Attorney, Agent, or Firm*—Rader, Fishman & Grauer PLLC

(57) ABSTRACT

In a display device comprising a suction fan for cooling and an air filter arranged on the suction side of the suction fan for cooling, there are provided means for calculating, in a case where the suction fan for cooling is driven, the integrated value of time periods during which the suction fan for cooling is driven, and means for displaying a warning message for causing a user to clean the air filter when the integrated value of the time periods during which the suction fan for cooling is driven is not less than a predetermined value.

4 Claims, 6 Drawing Sheets

DISPLAY DEVICE AND LIQUID CRYSTAL PROJECTOR

BACKGROUND OF THE INVENTION

1. Field of the Invention

The present invention relates to a display device and a liquid crystal projector.

2. Description of the Prior Art

As a light source lamp for backlight provided on a rear surface of a liquid crystal panel inside a liquid crystal projector, a metal halide lamp or an extra-high pressure mercury lamp is used. Therefore, the light source lamp for backlight significantly increases in temperature. Accordingly, the liquid crystal projector is provided with a suction fan for cooling for cooling the light source lamp for backlight.

When dust or dirt enters the liquid crystal projector, a shadow occurs when video is projected. Accordingly, the performance of the liquid crystal projector is degraded. In order to prevent the dust or dirt from entering the liquid crystal projector, therefore, an air filter is arranged on the suction side of the suction fan for cooling.

When the air filter is clogged, the suction capabilities of the suction fan for cooling are deteriorated, so that the temperature inside the liquid crystal projector rises.

In order to prevent the air filter from being clogged, the air filter may be periodically cleaned. In products comprising an air filter, for example, a cleaning machine, the air filter may be cleaned at the time point where it is felt that a suction force is weakened. However, a problem caused by the clogging of the air filter in the liquid crystal projector does not immediately appear as a normal symptom. Accordingly, the cleaning thereof is neglected in many cases.

When the liquid crystal projector continues to be used in a state where the air filter is clogged, the temperature inside the liquid crystal projector rises to reach a defined temperature, the power is shut off, entering a stand-by mode. Under such use circumstances that the temperature inside the liquid crystal projector reaches the defined temperature by the clogging of the air filter, the liquid crystal panel is degraded by the rise in the temperature to the time when the temperature inside the liquid crystal projector reaches the defined temperature.

SUMMARY OF THE INVENTION

An object of the present invention is to provide a display device and a liquid crystal projector capable of informing a user of the timing at which an air filter arranged on the suction side of a suction fan for cooling should be cleaned in order to prevent the liquid crystal projector from being used in a state where the air filter is clogged.

In a display device comprising a suction fan for cooling and an air filter arranged on the suction side of the suction fan for cooling, a first display device according to the present invention is characterized by comprising means for calculating, in a case where the suction fan for cooling is driven, the integrated value of time periods during which the suction fan for cooling is driven; and means for displaying a warning message for causing a user to clean the air filter when the integrated value of the time periods during which the suction fan for cooling is driven is not less than a predetermined value.

In a display device comprising a suction fan for cooling and an air filter arranged on the suction side of the suction fan for cooling, a second display device according to the present invention is characterized by comprising a circuit for calculating, in a case where the suction fan for cooling is driven, the integrated value of time periods during which the suction fan for cooling is driven; and a circuit for displaying a warning message for causing a user to clean the air filter when the integrated value of the time periods during which the suction fan for cooling is driven is not less than a predetermined value.

In a liquid crystal projector comprising a suction fan for cooling and an air filter arranged on the suction side of the suction fan for cooling, a first liquid crystal projector according to the present invention is characterized by comprising means for calculating, in a case where the suction fan for cooling is driven, the integrated value of time periods during which the suction fan for cooling is driven; and means for displaying a warning message for causing a user to clean the air filter when the integrated value of the time periods during which the suction fan for cooling is driven is not less than a predetermined value.

In a liquid crystal projector comprising a suction fan for cooling and an air filter arranged on the suction side of the suction fan for cooling, a second liquid crystal projector according to the present invention is characterized by comprising a circuit for calculating, in a case where the suction fan for cooling is driven, the integrated value of time periods during which the suction fan for cooling is driven; and a circuit for displaying a warning message for causing a user to clean the air filter when the integrated value of the time periods during which the suction fan for cooling is driven is not less than a predetermined value.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
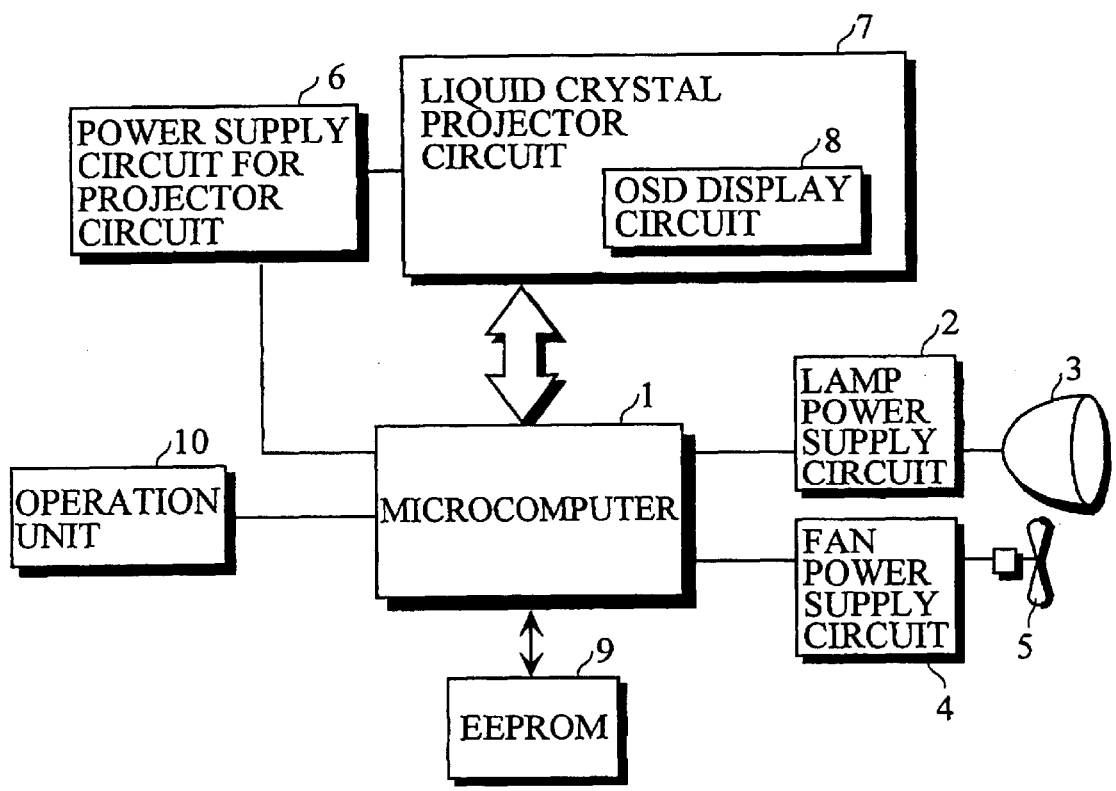
FIG. 1 is a block diagram showing the electrical configuration of a liquid crystal projector.

Referring now to the drawings, an embodiment of the present invention will be described.

FIG. 1 illustrates the electrical configuration of a liquid crystal projector.

The liquid crystal projector comprises a microcomputer 1. The microcomputer 1 controls a liquid crystal projector circuit 7 including a video signal processing circuit, a liquid crystal panel, and so forth. The liquid crystal projector circuit 7 also comprises an OSD display circuit 8 for producing an on screen display image which should be synthesized with a video signal, and can also display the on screen display image by the control of the microcomputer 1.

The microcomputer 1 controls a power supply circuit for a projector circuit 6 in order to control a state where the power is supplied to the liquid crystal projector circuit 7 (a power supply ON state, a stand-by mode state). Further, the microcomputer 1 controls a lamp power supply circuit 2 in order to control lighting/extinction of a light source lamp for backlight 3. The microcomputer 1 controls a fan power supply circuit 4 in order to control a suction fan for cooling 5 for cooling the light source lamp for backlight 3. An air filter, which is not illustrated, is arranged on the suction side of the suction fan for cooling 5.

Furthermore, the microcomputer 1 comprises the function of calculating the integrated value of time periods during which the suction fan for cooling 5 is in a driven state (hereinafter referred to as a cooling fan ON state integrated time period), and causing the OSD display circuit 8 to compose a warning message saying that an air filter should be cleaned when the calculated cooling fan ON state integrated time period is not less than a predetermined reference time period for judging cleaning, to display the warning message.

In order to realize the function, the microcomputer 1 comprises an EEPROM (Electrically Erasable and Programmable ROM) 9 for storing the integrated value of time periods during which the suction fan for cooling 5 is turned on and a reference value for judging cleaning. The reference value for judging cleaning can be changed depending on the place where the liquid crystal projector is installed, for example. When the liquid crystal projector is installed in a place which a lot of people enter and leave, for example, it is considered that a time period elapsed until the air filter is clogged is short. Accordingly, a relatively small value is set as the reference value for judging cleaning. When the air filter is used in an office or the like, it is considered that a time period elapsed until the air filter is clogged is long. Accordingly, a relatively large value is set as the reference value for judging cleaning.

An operation unit 10 is connected to the microcomputer 1. The operation unit 10 includes a remote control in addition to an operation unit provided in the main body of the liquid crystal projector.

Figure 2:
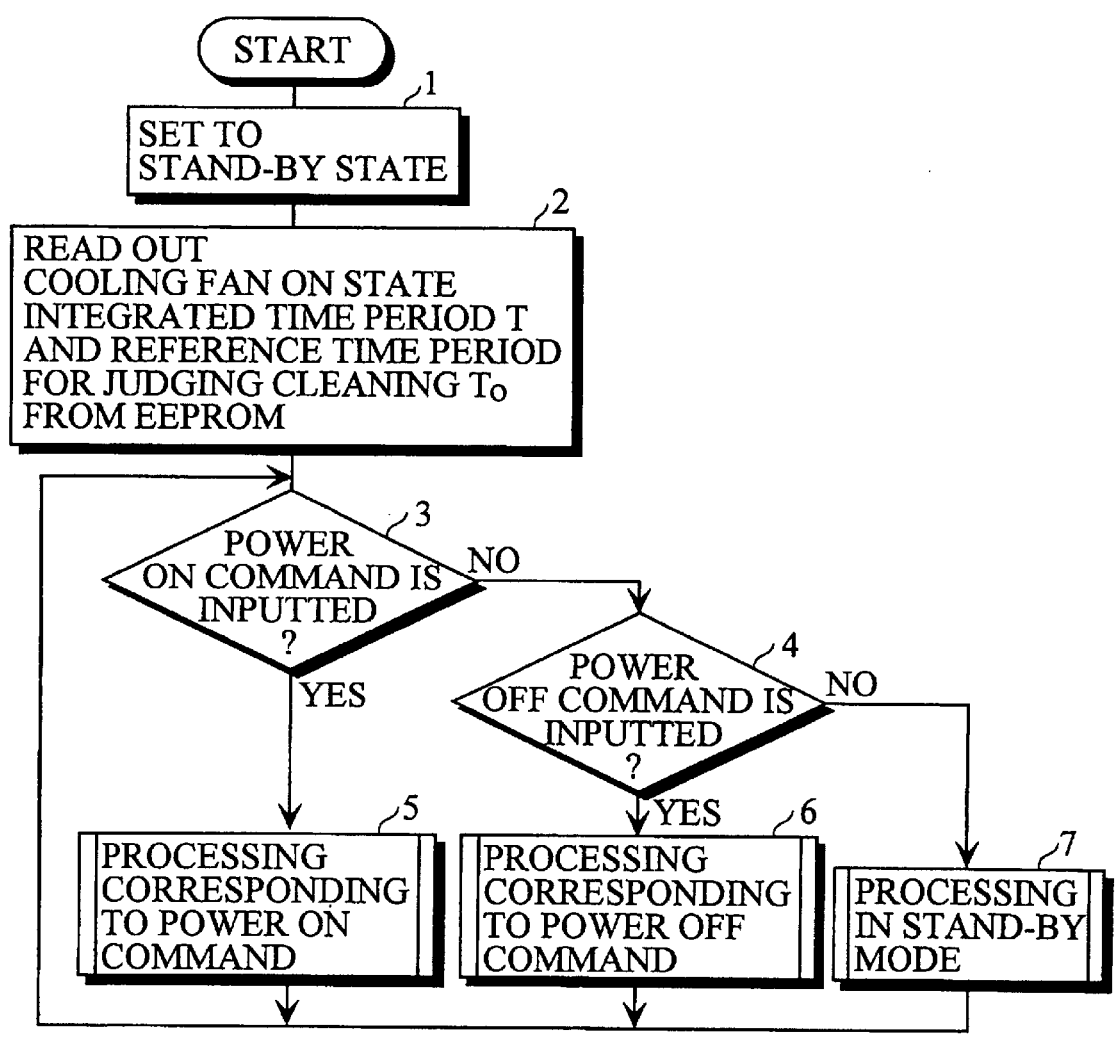
FIG. 2 is a flow chart showing the overall procedure for processing by a microcomputer.

FIG. 2 shows the procedure for overall processing of the microcomputer 1.

When the power is inputted to the microcomputer 1, that is, when a power supply plug of the liquid crystal projector is connected to an outlet, the microcomputer 1 sets the liquid crystal projector to a stand-by state (step 1). That is, the microcomputer 1 sets all the lamp power supply circuit 2, the fan power supply circuit 4, and the power supply circuit for a projector circuit 6 to an off state.

The microcomputer 1 then reads into a memory (a working memory) a cooling fan ON state integrated time period T and a reference time period for judging cleaning To up to the present time which have been stored in the EEPROM 9 (step 2).

Thereafter, the microcomputer 1 judges whether or not a command to turn on the power supply (a POWER ON command) is inputted from the operation unit 10 (step 3) and whether or not a command to turn off the power supply (a POWER OFF command) is inputted from the operation unit 10 (step 4).

When the POWER ON command is inputted from the operation unit 10 (YES in step 3), the microcomputer 1 performs processing corresponding to the POWER ON command (step 5). The program is returned to the step 3.

When the POWER OFF command is inputted from the operation unit 10 (YES in step 4), the microcomputer 1 performs processing corresponding to the POWER OFF command (step 6). The program is returned to the step 3.

When neither the POWER ON command nor the POWER OFF command is inputted from the operation unit 10, processing in a stand-by mode is performed (step 7). The program is returned to the step 3.

Figure 3:
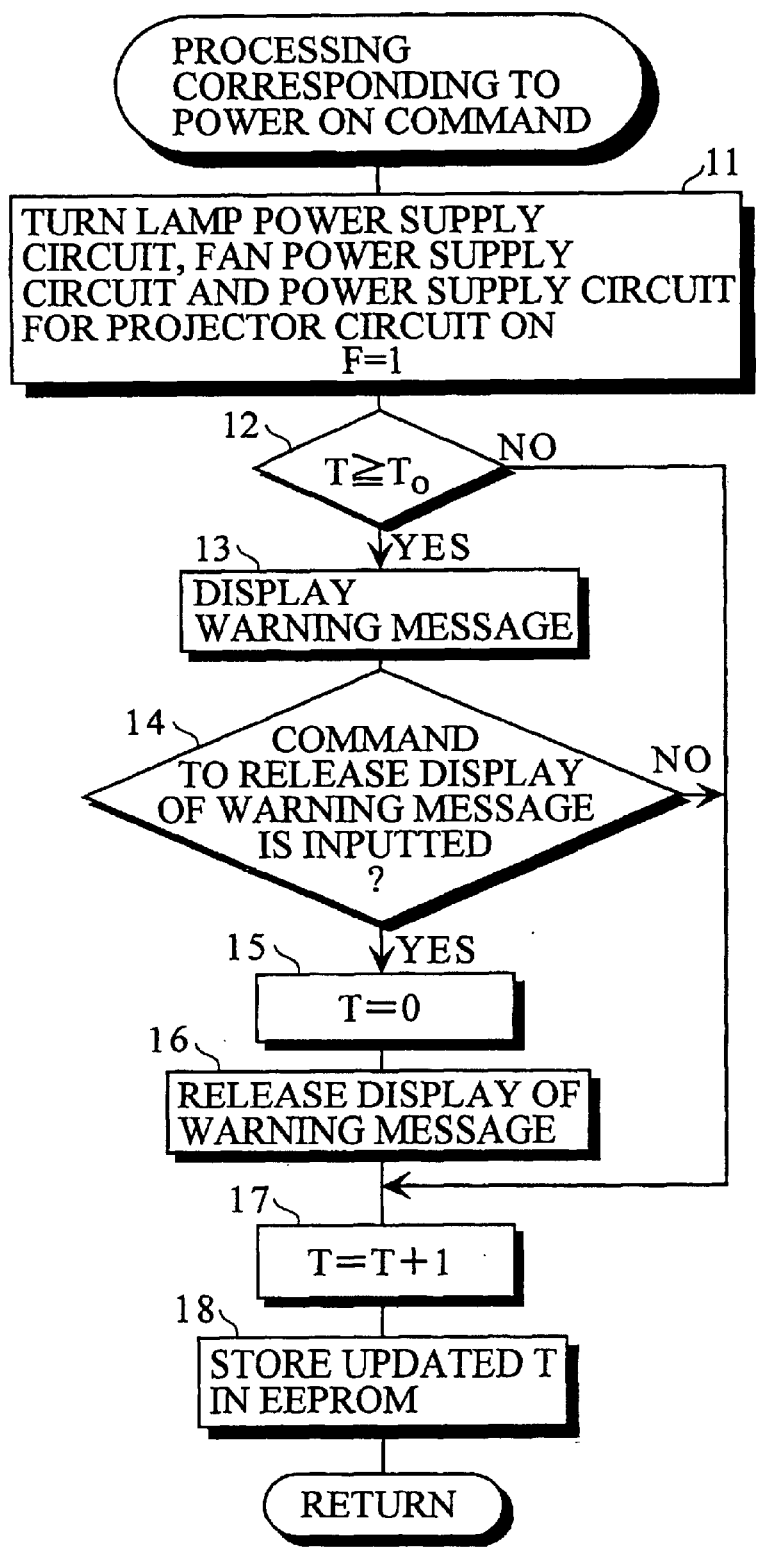
FIG. 3 is a flow chart showing the detailed procedure for processing corresponding to a POWER ON command (processing in the step 5 shown in FIG. 2)

FIG. 3 shows the detailed procedure for processing corresponding to the POWER ON command (processing in the step 5 shown in FIG. 2).

In the processing corresponding to the POWER ON command, the microcomputer 1 turns all the lamp power supply circuit 2, the fan power supply circuit 4, and the power supply circuit for a projector circuit 6 on, and sets a flag F storing the fact that the fan power supply circuit 4 is turned on (F=1) (step 11).

The microcomputer 1 then judges whether or not the cooling fan ON state integrated time period up to the present time is not less than the reference time period for judging cleaning (T≧To) (step 12).

Unless T≧To (when T<To), the program proceeds to the step 17. In the step 17, the microcomputer 1 increments the cooling fan ON state integrated time period T by one, thereby updating the cooling fan ON state integrated time period T. The microcomputer 1 stores in the EEPROM 9 the updated cooling fan ON state integrated time period T (step 18). Processing corresponding to the current POWER ON command is terminated.

Figure 6:
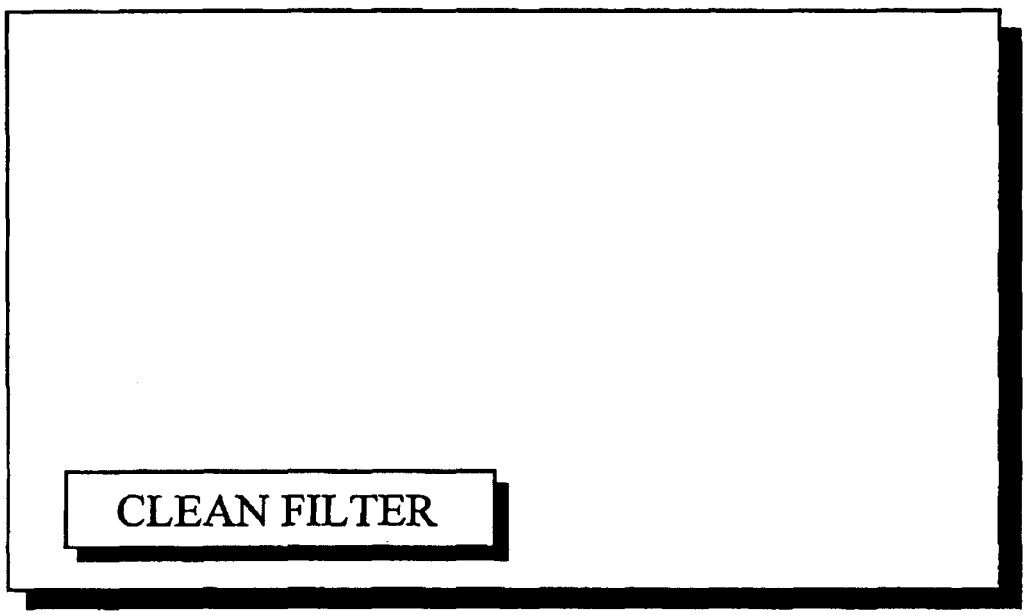
FIG. 6 is a schematic view showing an example of display of a warning message.

When it is judged in the foregoing step 12 that T≧To, the microcomputer 1 causes the OSD display circuit 8 to compose a warning message saying that the air filter should be cleaned, thereby displaying the warning message (step 13). FIG. 6 illustrates an example of the display of the warning message. In this example, the warning message is composed of a character string "Clean Filter". The user sees the display, to clean the air filter as well as to operate a display release key for the warning message which is provided in the operation unit 10. When the display release key for the warning message is operated, a command to release the display of the warning message is inputted to the microcomputer 1.

The microcomputer 1 judges whether or not the command to release the display of the warning message is inputted after the warning message is displayed (step 14). When the command to release the display of the warning message is not inputted, the program proceeds to the step 17.

When the command to release the display of the warning message is inputted, the microcomputer 1 clears the cooling fan ON state integrated time period T (T=0) (step 15), and releases the display of the warning message (step 16). Thereafter, the program proceeds to the step 17.

Figure 4:
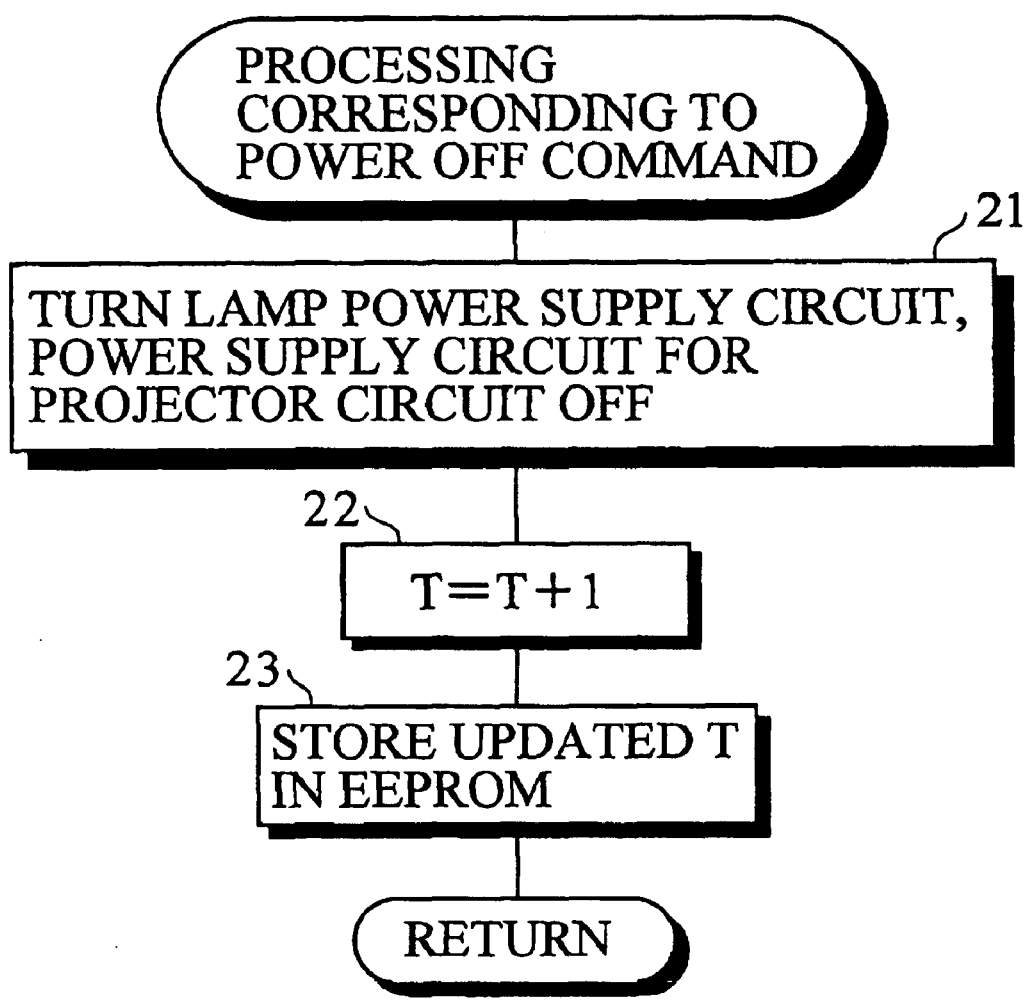
FIG. 4 is a flow chart showing the detailed procedure for processing corresponding to a POWER OFF command (processing in the step 6 shown in FIG. 2)

FIG. 4 shows the detailed procedure for the processing corresponding to the POWER OFF command (the processing in the step 6 shown in FIG. 2).

In the processing corresponding to the POWER OFF command, the microcomputer 1 turns the lamp power supply circuit 2 and the power supply circuit for a projector circuit 6 off (step 21). In this case, the fan power supply circuit 4 remains turned on in order to cool the light source lamp for backlight 3 for a predetermined time period by the suction fan for cooling 5 even after the light source lamp for backlight 3 is turned off.

Thereafter, the microcomputer 1 increments the cooling fan ON state integrated time period T by one, to update the cooling fan ON state integrated time period T (step 22). The microcomputer 1 stores the updated cooling fan ON state integrated timed period T in the EEPROM 9 (step 23). The processing corresponding to the current POWER OFF command is terminated.

Figure 5:
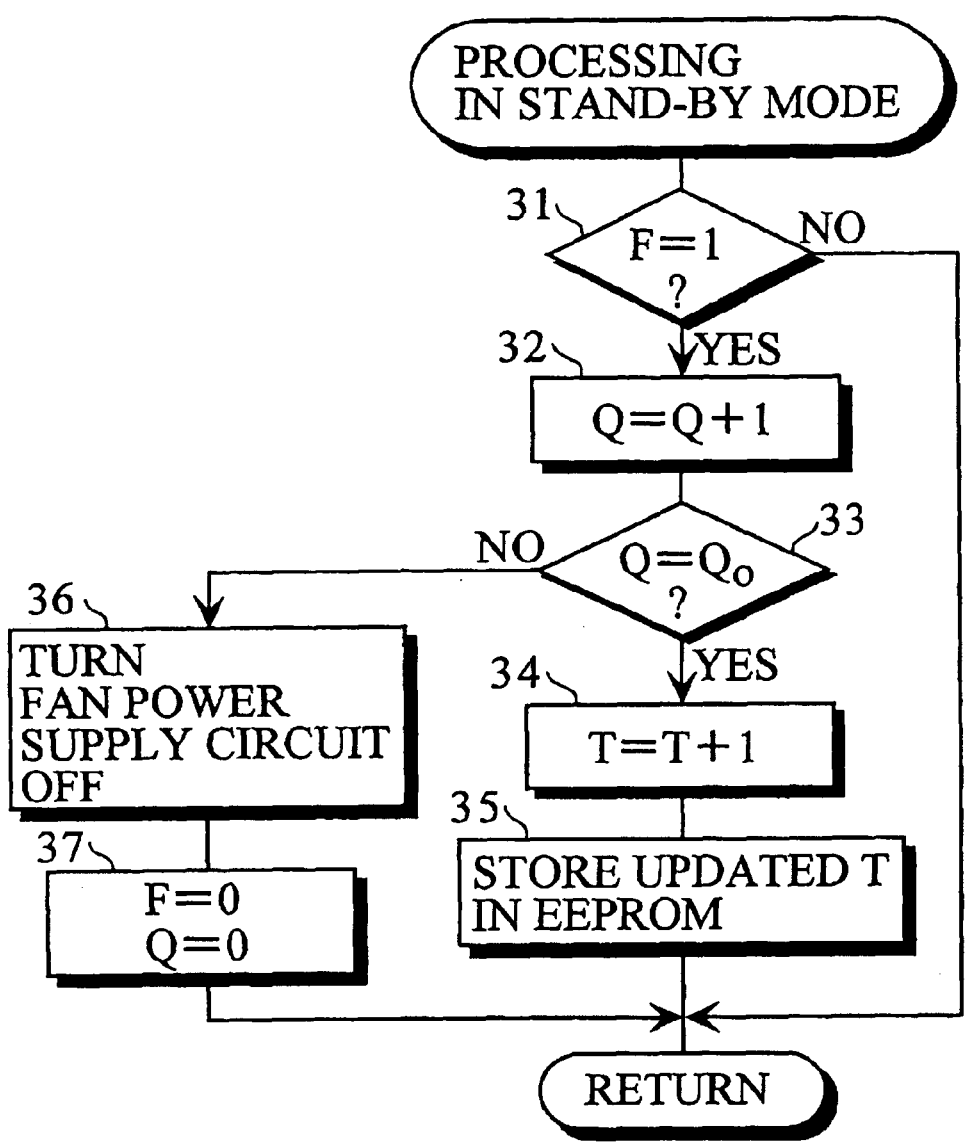
FIG. 5 is a flow chart showing the detailed procedure for processing in a stand-by mode (processing in the step 7 shown in FIG. 2)

FIG. 5 shows the detailed procedure for the processing in a stand-by mode (the processing in the step 7 shown in FIG. 2).

In the processing in the stand-by mode, the microcomputer 1 judges whether or not the flag F is set (step 31). When the flag F is not set, that is, when the fan power supply circuit 4 is turned off, the current processing in the stand-by mode is terminated.

When the flag F is set (F=1), that is, when the suction fan for cooling 5 is driven after the POWER OFF command is inputted, the microcomputer 1 increments a variable Q for counting a time period elapsed from the time when the POWER OFF command is inputted by one (step 32). It is judged whether or not the variable Q is not less than a predetermined time period Qo (Q≧Qo) (step 33).

Unless Q≧Qo (when Q<Qo), the microcomputer 1 increments the cooling fan ON state integrated time period T by one, thereby updating the cooling fan ON state integrated time period T (step 34). The microcomputer 1 stores the updated cooling fan ON state integrated time period T in the EEPROM 9 (step 35). The current processing in the stand-by mode is terminated.

When it is judged in the foregoing step 33 that Q≧Qo, the fan power supply circuit 4 is turned off (step 36). The flag F is rest (F=0), and Q is cleared (Q=0) (step 37). The current processing in the stand-by mode is terminated.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. In a display device comprising a suction fan for cooling and an air filter arranged on the suction side of the suction fan for cooling, the display device comprising:

means for calculating, in a case where the suction fan for cooling is driven, the integrated value of time periods during which the suction fan for cooling is driven; and means for displaying a warning message for causing a user to clean the air filter when the integrated value of the time periods during which the suction fan for cooling is driven is not less than a predetermined value.

2. In a display device comprising a suction fan for cooling and an air filter arranged on the suction side of the suction fan for cooling, the display device comprising:

a circuit for calculating, in a case where the suction fan for cooling is driven, the integrated value of time periods during which the suction fan for cooling is driven; and a circuit for displaying a warning message for causing a user to clean the air filter when the integrated value of the time periods during which the suction fan for cooling is driven is not less than a predetermined value.

3. In a liquid crystal projector comprising a suction fan for cooling and an air filter arranged on the suction side of the suction fan for cooling, the liquid crystal projector comprising:

means for calculating, in a case where the suction fan for cooling is driven, the integrated value of time periods during which the suction fan for cooling is driven; and means for displaying a warning message for causing a user to clean the air filter when the integrated value of the time periods during which the suction fan for cooling is driven is not less than a predetermined value.

4. In a liquid crystal projector comprising a suction fan for cooling and an air filter arranged on the suction side of the suction fan for cooling, the liquid crystal projector comprising:

a circuit for calculating, in a case where the suction fan for cooling is driven, the integrated value of time periods during which the suction fan for cooling is driven; and a circuit for displaying a warning message for causing a user to clean the air filter when the integrated value of the time periods during which the suction fan for cooling is driven is not less than a predetermined value.

* * * * *